UNITED STATES PATENT OFFICE.

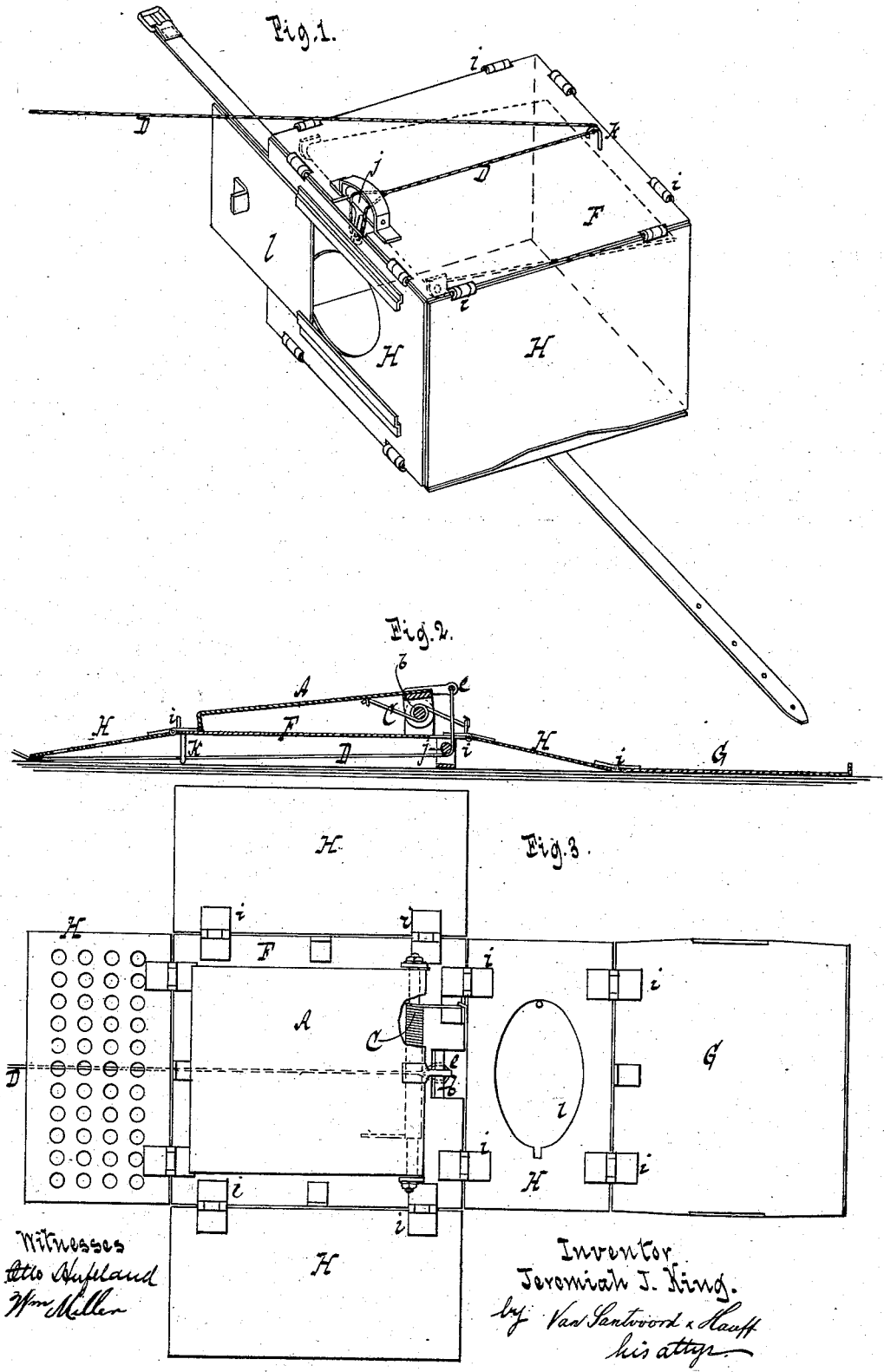

JEREMIAH J. KING, OF NEW YORK, N. Y., ASSIGNOR OF ONE-HALF TO EDWARD W. SAPORTAS, OF SAME PLACE.

PIGEON-STARTER.

SPECIFICATION forming part of Letters Patent No. 241,377, dated May 10, 1881.

Application filed February 2, 1881. (No model.)

*To all whom it may concern:*

Be it known that I, JEREMIAH J. KING, a citizen of the United States, residing at New York, in the county and State of New York, have invented new and useful Improvements in Starting Attachments to Pigeon-Traps, of which the following is a specification.

This invention relates to that class of traps used for releasing pigeons to be shot at on the wing; and it consists in a starting attachment formed of a pivoted flap, a retracting-spring acting on the flap, and a cord or wire connected thereto in a suitable manner to swing the flap on its pivot against the action of the spring, so that a vibrating motion can be imparted to the flap, which, serving to frighten the bird, insures its flight. The parts of the trap are hinged together to spread open, and the cord or its substitute is arranged to effect this purpose, besides serving to operate the flap.

This invention is illustrated in the accompanying drawings, in which Figure 1 represents a perspective view when the trap is closed. Fig. 2 is a longitudinal vertical section when it is spread open. Fig. 3 is a plan or top view thereof.

Similar letters indicate corresponding parts.

The letter A designates the flap hung on a pivot, b; C, the spring, and D the cord.

In this example the spring C is coiled on the pivot b, and it is arranged to act on the flap A, with a tendency to retract the same—namely, to force it up against the part to which it is pivoted when the trap is closed, as shown in Fig. 1, while the cord D is connected to the tail end of the flap, where it is provided with an eye, e.

The trap is made approximately square, and the top F, bottom G, and sides H thereof are hinged together, as at i, the part to which the flap A is pivoted being the top. The cord D passes from the flap A through the top F of the trap, near one end thereof, over a roller, j, and thence through an eye, k, on the outside of the top, near its other end.

In applying the trap to use the top F and sides H are adjusted to the proper positions to close the trap, as shown in Fig. 1, and the bird is put into it through a door, l, in one side thereof. Then when the bird is to be set at liberty the cord D is pulled upon, whereby the top F and sides H of the trap are thrown out and spread flat on the ground, the whole taking the position shown in Figs. 2 and 3; and in this position of the parts the spring C still tends to force the free end of the flap against the top F. The cord is then alternately pulled upon and released, whereby a vibrating motion is imparted to the flap A, which has the effect of startling the bird and causing its flight. The cord D thus serves not only to operate the flap, but also to spread open the trap, while by the arrangement of the flap it leaves the interior of the trap free when it is closed. It should be remarked, however, that the flap is applicable also to traps constructed in other ways than the one shown and described.

I am aware that a pigeon-starter has been made in which the figure of an animal springs from a crouching position to an erect position, and such forms no part of my invention.

What I claim as new, and desire to secure by Letters Patent, is—

1. A starting attachment to pigeon-traps, consisting of a pivoted flap, a retracting-spring acting on the flap, and an operating-cord connected thereto, the whole adapted for use substantially as described.

2. The combination, with a trap the parts of which are hinged together to spread open, of a starting attachment consisting of a pivoted flap, a retracting-spring acting on the flap, and an operating-cord connected both to the flap and to a movable portion of the trap, substantially as described, for the purpose set forth.

In testimony whereof I have hereunto set my hand and seal in the presence of two subscribing witnesses.

JEREMIAH J. KING. [L. S.]

Witnesses:
 E. F. KASTENHUBER,
 CHAS. WAHLERS.